United States Patent Office 3,252,852
Patented May 24, 1966

3,252,852
PROCESS OF ADDING A POLYETHYLENE IMINE-CALCIUM CARBONATE FILLER TO CELLULOSIC FIBERS AND PAPER THEREOF
Paul Lagally, State College, Pa., assignor to Chemirad Corporation, East Brunswick, N.J., a corporation of Delaware
No Drawing. Continuation of abandoned application Ser. No. 41,719, July 11, 1960. This application Feb. 15, 1965, Ser. No. 432,847
14 Claims. (Cl. 162—169)

The present application is a continuation application of application Serial No. 41,719, filed July 11, 1960, now abandoned. The present invention relates to a process of preparing modified filler materials based on calcium carbonate or other water-insoluble metal carbonates, and more particularly to a process of producing such modified filler materials which are especially suitable as filler materials for paper pulp, and to such modified filler materials.

The outstanding qualities of calcium carbonate, for instance, as paper filler, particularly in the manufacture of highly bleached paper grades, such as book or magazine paper, are well known. However, considerable difficulties are encountered when incorporating such a filler at a high rate into paper pulp, because it is not sufficiently retained by the paper fibers. Incomplete retention results in freeness losses, in decreased machine speeds, and in the necessity of excessive recycling of the pulp, which in turn produces pin holes and a two-sided appearance of the paper surface. In order to overcome these draw-backs, the paper surface must be coated, even though the particular paper grade may not require a finish.

Various techniques have been developed to improve the retention of fillers. Flocculating agents such as melamine or urea-formaldehyde resins, polyacrylamides or polyacrylates are effective in acidic medium only or they are linked to the use of alum which in itself is a common flocculating agent. Such additives, however, cannot be employed in combination with calcium carbonate, which is unstable under acidic working conditions. Calcium carbonate has also been coated with hydrophobic substances derived from fatty acids, but this method is not economical and in many instances not desired.

It is an object of the present invention to provide a simple and effective process of improving and modifying the properties of filler materials based on calcium carbonate and other substantially water-insoluble metal carbonates so as to overcome the difficulties encountered, for instance, when incorporating calcium carbonate and other metal carbonates into paper pulp.

Another object of the present invention is to provide a highly improved and modified filler material based on calcium carbonate or other substantially water-insoluble metal carbonates which is especially suitable in paper manufacture.

A further object of the present invention is to provide a simple and effective process of incorporating such modified calcium carbonate and the like filler material into aqueous dispersions of fibrous materials such as paper pulp.

Other objects of the present invention and advantageous features thereof will become apparent as the description proceeds.

An important embodiment of the invention is a process for making a filler which is the reaction product of calcium carbonate and a polyalkylene imine, such as polyethylene imine. The resulting filler has a remarkable increased retention for cellulose fiber and paper pulp. In accordance with the invention the process comprises treating a calcium carbonate or other metal carbonate suspension with a water-soluble polyalkylene imine, such as polyethylene imine to give an insoluble polyethylene imine carbonate product which adheres to fibers with remarkable tenacity. In particular, the process of this invention may be carried out in the absence of an acidic sizing agent, such as sodium rosinate.

Another embodiment of the invention comprises modifying the filler properties of calcium carbonate and of other substantially water-insoluble metal carbonates with a water-soluble polyalkylene imine which is capable of forming a water-insoluble carbonate. Another aspect of the invention comprises reacting cellulose fibers with the polyethylene imine carbonate filler.

A further embodiment of the invention provides paper pulp having strongly and intimately affixed thereto the water-insoluble polymer reaction product of a calcium carbonate and a water-soluble polyalkylene imine. The paper may be free of acidic sizes sensitive to alkaline conditions or it may be free of sizes, including those of the acid type. In view of the fact that the prior art had to resort to the use of sizes to improve the retention of fillers, it is an unexpected aspect of this invention that the substantivity of a filler, such as calcium carbonate is so significantly strengthened on the fibers of the pulp in accordance with this invention without the using of sizing.

Another unexpected aspect of the invention is the fact that it is the retention property of the filler to the fiber which is developed rather than that of strength of the fiber, a characteristic which is often developed by the use of polyethylene imine. Another unexpected aspect of the invention relates to the electrokinetic charges of the polyethylene imine and of the filler and is described further below.

In accordance with the invention, there is obtained a polymeric polyalkylene imine, such as a polyethylene imine reaction product with calcium carbonate which is water-insoluble. This polymer product apparently results from the polyethylene imine covering free cationic sites on the calcium carbonate particle and sharing common $CO_3^{2-}$ ions. This polymer is useful in the treatment of cellulose fibers to which it adheres with remarkable tenacity. It may be used directly, as obtained, as a suspension in water or as a dry, solid material which may be added to cellulose fibers in suspension.

The amount of calcium carbonate-polyethylene imine filler which is incorporated into the paper pulp and is permanently affixed to the pulp fibers varies within the ranges required as from about 6 to 20% or even more, such as 50% of the paper fibers. A range of 10 to 20% by weight of the fiber is often a desirable amount. Incorporation of such pretreated calcium carbonate fillers into paper pulp is effected by using conventional paper making techniques. The filler particles attach themselves firmly and irreversibly to the surface of the pulp fibers and remain uniformly distributed throughout the resulting paper sheet. As a result, a paper sheet is obtained of which both sides have the same appearance. In contrast, if calcium carbonate unreacted with polyethylene imine is used, a different filler loading is effected on either side of the paper sheet. This different loading results from the filtering action through the Fourdrinier wire on the paper machine. The new calcium carbonate-polyethylene imine filler eliminates the necessity of surface coatings which are applied to many grades of paper for the sole purpose of hiding the two-sided appearance of the paper sheet. The present invention thus simplifies the paper making process and improves its economics. The paper products of the invention have permanently affixed to the pulp fibers and incorporated therewith considerable amounts of calcium carbonate-polyethylene imine polymer filler. The amounts of filler retained in the fiber on the basis of the amount used often ranges from about 40 to 70 percent. Higher amounts such as about 80 percent or more being attainable under certain circumstances. It is an advantageous aspect of the invention that such high amounts of filler are retained on the fibers in accordance with the invention. such high filler retention is of special value in the manufacture of certain papers such as paper unsized with acidic sizes, like letterpress paper. The paper products of the invention have high opacity, good printability uniformly on both sides of the paper and good hydrophilic properties.

In accordance with the invention the alkylene imines which may be used include a water-soluble polyethylene imine. Preferably the polymer has a degree of polymerization between 200 to about 1500 and preferably between about 700 to about 950.

In accordance with the process of the invention, polyethylene imine or other polyalkylene imines which form water-insoluble carbonates are added to an aqueous calcium salt solution, for instance, a calcium chloride solution. The reaction product of the calcium carbonate and the polyethylene imine, the insoluble polyethylene imine carbonate is then precipitated by the addition of an alkali metal carbonate or ammonium carbonate. According to another embodiment of the present invention, polyethylene imine or the polyalkylene imine which forms an insoluble carbonate may be added to an aqueous calcium carbonate or other metal carbonate suspension, preferably while stirring. The calcium carbonate-polyethylene imine reaction product is thereby formed in situ as an insoluble suspension. The polymer reaction product of calcium carbonate and polyethylene imine may be added as such to the paper pulp or it may be allowed to settle and may then be separated from the supernatant liquid and dried, if so desired, to the degree desired to a solid. The product may be suspended in a suitable liquid, such as water, and the suspension may be used for the treatment of and incorporation into the fibers. Alternatively, the calcium carbonate-polyethylene imine polymer may be used directly and admixed to the fiber suspension.

The polyalkylene imines may also be used in their monomer state. For instance, ethylene imine may be added to the calcium carbonate suspension. Polymerization is then effected in known manner on the surface of the calcium carbonate filler. The filler is then used as described above.

Polyethylene imine has been reported to bring about moderate filler retention, if added to aqueous paper pulps containing clay or titanium dioxide. This retention is due to the acidic nature of these fillers which, in contact with water, exhibit a negative electrokinetic potential. Their surfaces are cross-linked by the oppositely charged polyethylene imine. In contrast thereto, calcium carbonate and other metal carbonates have basic properties, i.e. about the same positive electrokinetic potential as polyethylene imine under the conditions of the non-equilibrium system of the process. It is, therefore, quite unexpected that polyethylene imine is capable of improving filler retention of calcium carbonate, or other metal carbonate fillers, by the paper fibers of the pulp.

Although this invention is not limited to any theory of action, it believed that the capability of the polyalkylene imines, which are only partly present in the form of their carbonates, have a strong cationic character, they are retained instantly by the negative cellulose and can undergo secondary reactions based on hydrogen bonding, base exchange, or ether formation which makes this retention irreversible. Whereas the untreated fibers can supply only occasional reaction sites for the calcium carbonate, the treated fibers exhibit a reactivity which is several hundred times greater. This is plainly understood on the basis that for each polyethylene imine molecule entering the fibrous framework and having a molecular weight of about 30,000 as many as 800 new reactive sites are created in the surface of the cellulose fiber. These new sites have undergone a new reaction, namely that of salt formation, whereby polyethylene imine cations and $Ca^{2+}$ ions share common $CO_3^{2-}$ ions.

In accordance with the process of the invention the calcium carbonate-polyethylene imine polymer filler is reacted with an aqueous cellulosic suspension such as a fiber suspension under neutral or basic conditions. The pH of the aqueous medium in which the reaction is carried out is maintained from about 6.5 and preferably 7.0 to about 8.5 or 9.0 or under certain circumstances even higher to about 10.0. Generally, a pH range from about 7.5 to 8.5 brings about very satisfactory results.

The amounts of polyethylene imine or of the polyalkylene imines to be added to the calcium carbonate suspension are between about 0.05% and about 1.0% calculated for calcium carbonate or the like filler material. The preferred amounts are between 0.2% and about 0.5%. It is of course, understood that the present invention is not limited to such amounts. Higher amounts may also be used although they render the process rather uneconomical and do not cause a noteworthy improvement in the properties of the treated filler materials.

Preferably polyethylene imine or the respective polyalkylene imines are added to the metal carbonate suspension in the form of their aqueous solutions. The contents of polyethylene imine or, respectively, polyalkylene imines in such solutions may be as high as their solubility permits. The term "substantially water insoluble metal carbonate" defines a metal carbonate of about the same low solubility in water as calcium carbonate.

The following examples serve to illustrate the present invention without, however, limiting the same thereto:

*Example 1*

To 10 parts of an aqueous suspension containing 20% of calcium carbonate, corresponding to 2 parts of solid material, there are added 2.5 parts of an aqueous solution containing 0.05% of polymerized ethylene imine of an average degree of polymerization of 800, corresponding to 0.00125 part of solid polyethylene imine, while stirring. The resulting suspension is added without further treatment to the paper pulp. The treated calcium carbonate may also be allowed to settle and be separated from the water and dried. The product contained 0.063% of polyethylene imine.

There are added 286.5 parts of a paper pulp of 2% consistency corresponding to 5.73 parts of dry cellulose to the suspension of modified calcium carbonate obtained as described hereinabove. The pulp is composed of 50% of Hardwood Soda Pulp and 50% of Softwood Bleached Sulfite Pulp, which had been beaten to a freeness of 30° S.R. The pH is in the range of 7.5 to 8.5. After stirring for a few seconds, hand sheets were made using standard paper sheet making equipment. After drying, the sheets were analyzed. They contained 13.41% of calcium carbonate, which corresponds to a retention of 51.8%. The control made with calcium carbonate to which no polyethylene imine was added, had only 46.2% of calcium carbonate retained.

*Example 2*

To 10 parts of an aqueous suspension containing 20% of calcium carbonate corresponding to 2 parts of solid material, there were added 10 parts of an aqueous solution containing 0.05% of polymerized ethylene imine. The modified filler was prepared as described in Example 1. It had a polyethylene imine content of 0.25%. Hand sheets which were prepared in the same manner as described above contained 17.62% of calcium carbonate which corresponds to a retention of 68.2%.

*Example 3*

The following Table I indicates the results achieved with a calcium carbonate pretreated according to the present invention with the amounts of polyethylene imine as indicated. The procedure is the same as described in Example 1. The pulp was a pulp of 30° S.R. of the same composition as used in Example 1. It did not contain alum or size. The suspension has a pH in the range of 7.5 to 8.5.

TABLE I

| Cellulose, g. | CaCO₃, g. | Polyethylene imine, percent | Retention, percent | Increase percent |
|---|---|---|---|---|
| 6.05 | 4.00 | 0.165 | 69.3 | 23.0 |
| 6.05 | 4.00 | 0.33 | 70.4 | 25.2 |
| 6.05 | 4.00 | 0.66 | 64.8 | 14.4 |
| 6.05 | 4.00 | --------- | 57.3 | ------ |

The increase in this Table I and the following Tables II and III is calculated as increase in percent over the control values.

*Example 4*

The following Table II represents retention results with other proportions of cellulose, calcium carbonate, and polyethylene imine than given in the preceding examples, while otherwise the composition of the pulp and the procedure are the same as described in Example 1.

TABLE II

| Cellulose, g. | CaCO₃, g. | Polyethylene imine, percent | Retention, percent | Increase percent |
|---|---|---|---|---|
| 5.73 | 2.00 | 0.044 | 59.2 | 8.2 |
| 5.73 | 2.00 | 0.175 | 79.6 | 45.6 |
| 5.73 | 2.00 | --------- | 54.7 | ------ |

*Example 5*

The following Table III represents retention results with the same proportions of cellulose and calcium carbonate but with another type of pulp. Otherwise the procedure is the same as described in Example 1.

TABLE III

| Cellulose, g. | CaCO₃, g. | Polyethylene imine, percent | Retention, percent | Increase percent |
|---|---|---|---|---|
| 5.73 | 2.00 | 0.044 | 53.5 | 15.8 |
| 5.73 | 2.00 | 0.044 | 53.7 | 16.2 |
| 5.73 | 2.00 | 0.044 | 51.8 | 12.1 |
| 5.73 | 2.00 | 0.175 | 71.6 | 55.0 |
| 5.73 | 2.00 | 0.175 | 70.4 | 52.4 |
| 5.73 | 2.00 | 0.175 | 68.2 | 47.6 |
| 5.73 | 2.00 | --------- | 46.2 | ------ |

It is evident that the increase in retention of the treated calcium carbonate by the paper pulp is very considerable. Similar results are obtained with other metal carbonate fillers, such as barium carbonate, magnesium carbonate, Raffold (calcium carbonate-magnesium hydroxide) and others. The treated filler materials may be used not only in paper pulp but also in other aqueous dispersions of fibrous materials into which such carbonate fillers are to be incorporated.

Of course, many changes and variations in the polyethylene imines forming water insoluble carbonates, in the amounts of such polyethylene imines used, in the proportion of carbonate filler to retention improving polyethylene imines, in the manner of pre-treating the metal carbonate filler material with the polyethylene imines, in the amounts of treated carbonate filler material incorporated into paper pulp and the like material, in the manner in which such a pretreated carbonate filler material is admixed to the paper pulp, and the like may be made by those skilled in this art in accordance with the principles set forth herein and in the claims annexed hereto.

I claim:

1. A process of incorporating a filler into a fibrous material which comprises reacting by mixing an aqueous suspension of a calcium carbonate with an aqueous solution of polyethylene imine, thereby forming an insoluble reaction product therefrom, forming a suspension of the insoluble calcium carbonate-polyethylene imine polymer reaction product of said carbonate and said polyethylene imine, incorporating the polymer suspension into cellulosic fibers in an aqueous suspension thereof while maintaining the pH in the range of about 6.5 to about 10 to cause a reaction between said reaction product and the cellulose fiber, and separating from the water the fibers having affixed thereto and incorporated therewith the calcium carbonate-polyethylene imine polymer filler.

2. A process of incorporating a filler into a fibrous material which comprises reacting by mixing an aqueous suspension of a calcium carbonate with an aqueous solution of polyethylene imine, thereby forming an insoluble reaction product therefrom, forming a suspension of the insoluble calcium carbonate-polyethylene imine polymer reaction product of said carbonate and said polyethylene imine, incorporating the polymer suspension into cellulosic fibers in an aqueous suspension thereof while maintaining the pH in the range of about 6.5 to about 10 to cause a reaction between said reaction product and the cellulose fiber, free of acidic sizing agent and separating from the water the fibers having affixed thereto and incorporated therewith the calcium carbonate-polyethylene imine polymer filler.

3. A process of incorporating a filler into a fibrous material which comprises reacting by mixing an aqueous suspension of a calcium carbonate with an aqueous solution of polyethylene imine, thereby forming an insoluble reaction product therefrom, forming a suspension of the insoluble calcium carbonate-polyethylene imine polymer reaction product of said carbonate and said polyethylene imine, incorporating the polymer suspension into cellulosic fibers in an aqueous suspension thereof while maintaining the pH in the range of about 6.5 to about 10 to cause a reaction between said reaction product and the cellulose fiber, free of sizing agent and separating from the water the fibers having affixed thereto and incorporated therewith the calcium carbonate-polyethylene imine polymer filler.

4. A process of incorporating a filler into a fibrous material which comprises reacting by mixing an aqueous suspension of a calcium carbonate with an aqueous solution of polyethylene imine, thereby forming an insoluble reaction product therefrom, forming a suspension of the insoluble calcium carbonate-polyethylene imine polymer reaction product of said carbonate and said polyethylene imine, incorporating the polymer suspension into cellulosic fibers in an aqueous suspension thereof while maintaining the pH in the range of about 6.5 to about 10 to cause a reaction between said reaction product and the cellulose fiber, at a pH of about 6.5 to about 8.5 and separating from the water the fibers having affixed thereto and incorporated therewith the calcium carbonate-polyethylene imine polymer filler.

5. A process of incorporating a filler into a fibrous material which comprises reacting by mixing an aqueous suspension of a calcium carbonate with an aqueous solution of polyethylene imine, thereby forming an insoluble reaction product therefrom, forming a suspension of the insoluble calcium carbonate-polyethylene imine polymer reaction product of said carbonate and said polyethylene imine, incorporating the polymer suspension into cellulosic fibers in an aqueous suspension thereof while maintaining the pH in the range of about 6.5 to about 10 to cause a reaction between said reaction product and the cellulose fiber, at a pH of at least about 7.0 and separating from the water the fibers having affixed thereto and incorporated therewith the calcium carbonate-polyethylene imine polymer filler.

6. The process of claim 1 in which the amount of polyethylene imine used ranges from about 0.05% to about 1% of said calcium carbonate.

7. A process of incorporating a filler into a fibrous material which comprises reacting by mixing an aqueous suspension of a calcium carbonate with an aqueous solution of polyethylene imine, forming a suspension of an insoluble calcium carbonate-polyethylene imine polymer reaction product of said carbonate and said polyethylene imine, incorporating the polymer suspension into cellulosic fibers in an aqueous suspension thereof and separating from the water the fibers having affixed thereto and incorporated therewith at least about 40% of the amount of the calcium carbonate-polyethylene imine polymer filler used.

8. A process for making a paper sheet which comprises reacting by mixing an aqueous suspension of a calcium carbonate with an aqueous solution of polyethylene imine, thereby forming an insoluble reaction product therefrom, forming a suspension of the insoluble calcium carbonate-polyethylene imine polymer reaction product of said carbonate and said polyethylene imine, incorporating the polymer suspension into cellulosic fibers in an aqueous suspension thereof while maintaining the pH in the range of about 6.5 to about 10 to cause a reaction between said reaction product and the cellulose fiber, separating from the water the fibers having affixed thereto and incorporated therewith the calcium carbonate-polyethylene imine polymer filler and making a filled paper sheet therewith.

9. A process of incorporating a filler into a fibrous material which comprises reacting by mixing an aqueous suspension of a metal carbonate with an aqueous solution of polyethylene imine, thereby forming an insoluble reaction product therefrom, forming a suspension of the insoluble metal carbonate-polyethylene imine polymer reaction product of said carbonate and said polyethylene imine polymer, incorporating the polymer suspension into cellulosic fibers in an aqueous suspension thereof while maintaining the pH in the range of about 6.5 to about 10 to cause a reaction between said reaction product and the cellulose fiber, and separating from the water the fibers having affixed thereto and incorporated therewith the metal carbonate-polyethylene imine polymer filler.

10. A fibrous product having incorporated therein and affixed to and reacted with the fibers from about 6 to about 20% by weight of a calcium carbonate-polyethylene imine filler which is a reaction product of calcium carbonate and polyethylene imine, the fibers being reacted essentially only with said reaction product.

11. A paper product having permanently affixed to and reacted with and throughout its fibers from about 6 to about 20% by weight of a calcium carbonate-polyethylene imine filler which is a reaction product of calcium carbonate and polyethylene imine, the fibers being reacted essentially only with said reaction product.

12. An unsized paper product having permanently affixed to and reacted with and throughout its fibers from about 6 to about 20% by weight of a calcium carbonate-polyethylene imine filler which is a reaction product of calcium carbonate and polyethylene imine, the fibers being reacted essentially only with said reaction product.

13. A paper product free of acidic sizing having permanently affixed to and reacted with and throughout its fibers from about 6 to about 20% by weight of a calcium carbonate-polyethylene imine filler which is a reaction product of calcium carbonate and polyethylene imine, the fibers being reacted essentially only with said reaction product.

14. A paper product having permanently affixed to and reacted with and throughout its fibers from about 6 to about 20% by weight of a metal carbonate-polyethylene imine filler which is a reaction product of a metal carbonate and polyethylene imine, the fibers being reacted essentially only with said reaction product.

References Cited by the Examiner
UNITED STATES PATENTS 2,698,793  1/1955  Landes et al. _____ 162—164

OTHER REFERENCES

Libby: Pulp and Paper Science and Technology, vol. II, McGraw-Hill Book Co., N.Y., 1962, page 85.

DONALL H. SYLVESTER, *Primary Examiner.*

S. L. BASHORE, *Assistant Examiner.*